United States Patent [19]

Banerjea

[11] 4,170,376
[45] Oct. 9, 1979

[54] DIMPLED DOOR HARDWARE

[75] Inventor: Tara N. Banerjea, Warren, Mich.

[73] Assignee: Fruehauf Corporation, Detroit, Mich.

[21] Appl. No.: 814,776

[22] Filed: Jul. 11, 1977

[51] Int. Cl.² .............................................. E05C 9/08
[52] U.S. Cl. .................................................. 292/218
[58] Field of Search ...................... 292/218, DIG. 32; 49/394, 395

[56] References Cited

U.S. PATENT DOCUMENTS

| 1,214,892 | 2/1917 | Budd | 49/503 |
|---|---|---|---|
| 1,500,169 | 7/1924 | Walker | 292/218 |
| 1,728,530 | 9/1929 | Drenning | 292/218 |
| 3,778,934 | 12/1973 | Fisher | 49/503 |
| 3,912,312 | 10/1975 | Cerutti | 292/218 |
| 3,989,289 | 11/1976 | Ringe | 292/241 |

*Primary Examiner*—Richard E. Moore
*Attorney, Agent, or Firm*—Harness, Dickey & Pierce

[57] ABSTRACT

An over-the-road vehicle in the nature of a trailer or a van has a body provided with an open end formed by oppositely disposed side pillars, a header and a sill. A pair of doors are hinged to the pillars with channel members secured near the opposite door edges having bearings at the ends in which locking rods are secured against edgewise movement while being pivotally mounted within the channel members. The ends of the rods are supported in cantilever from the ends of the channel members having on the ends a cam finger which engages cams within castings secured to the header and sill by which the doors are moved to secured closed position when the rods are rotated. When a load is applied to the inner surface of the door, the ends of the locking rods will bend from the ends of the channel members providing a bending moment from the channel ends to the ends of the rods. When the force is substantially increased, the rods will engage the edge of the door to change the length of the bending moment arm thereby withstanding the increased load without any permanent damage to the hardware or door edge.

4 Claims, 11 Drawing Figures

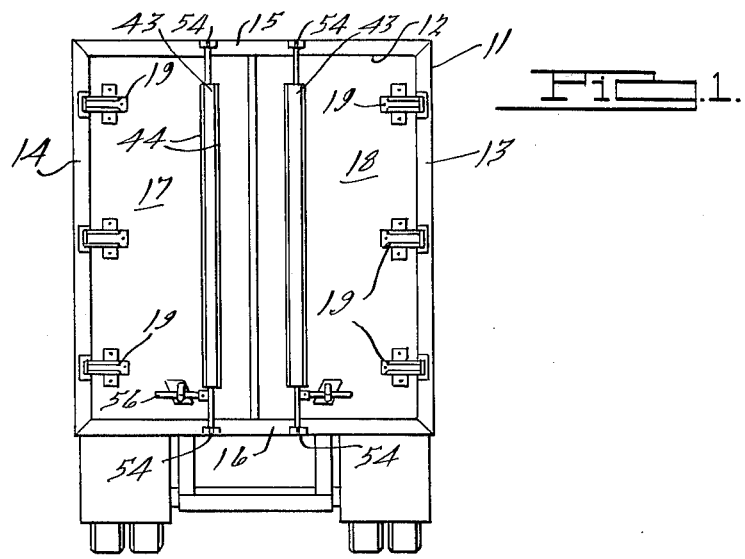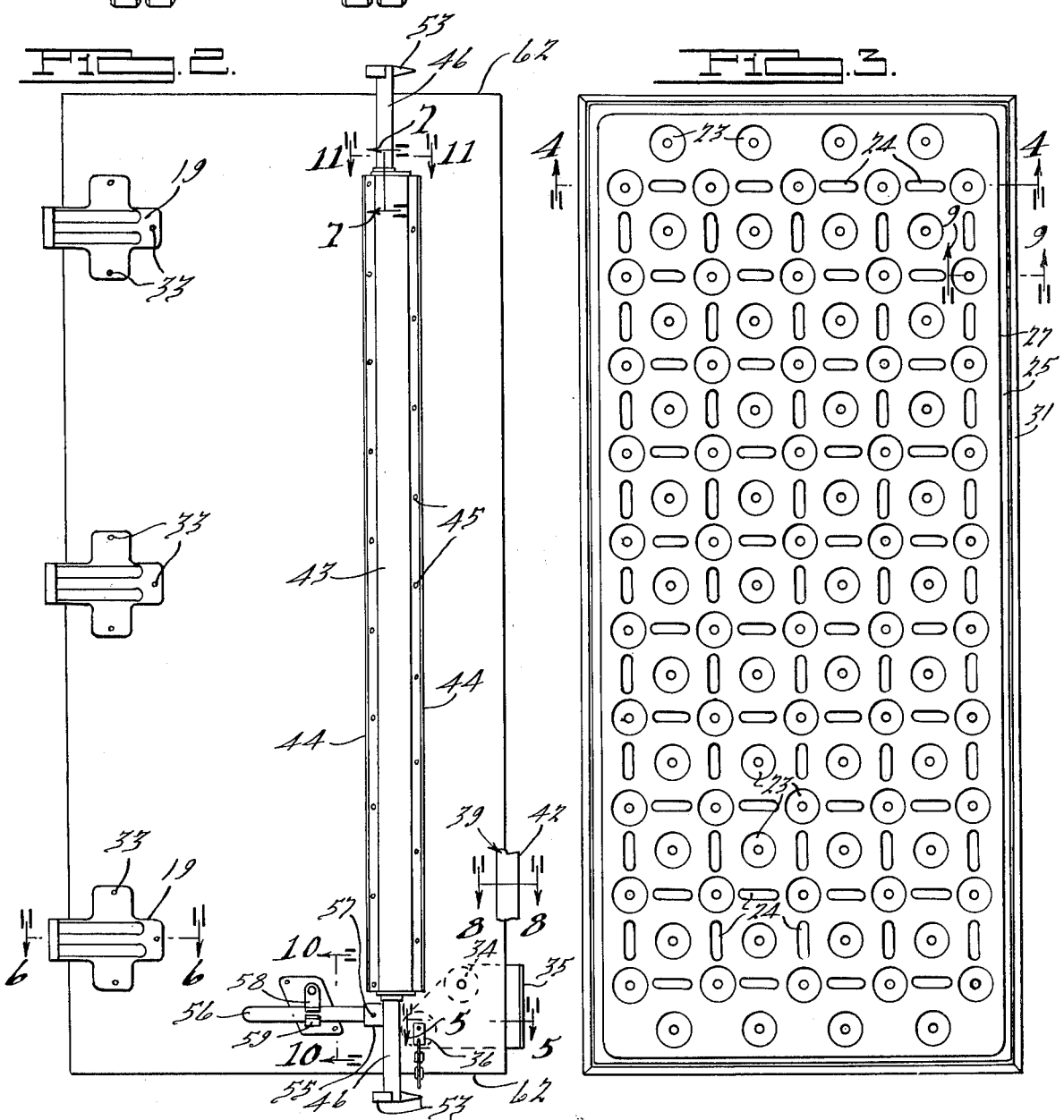

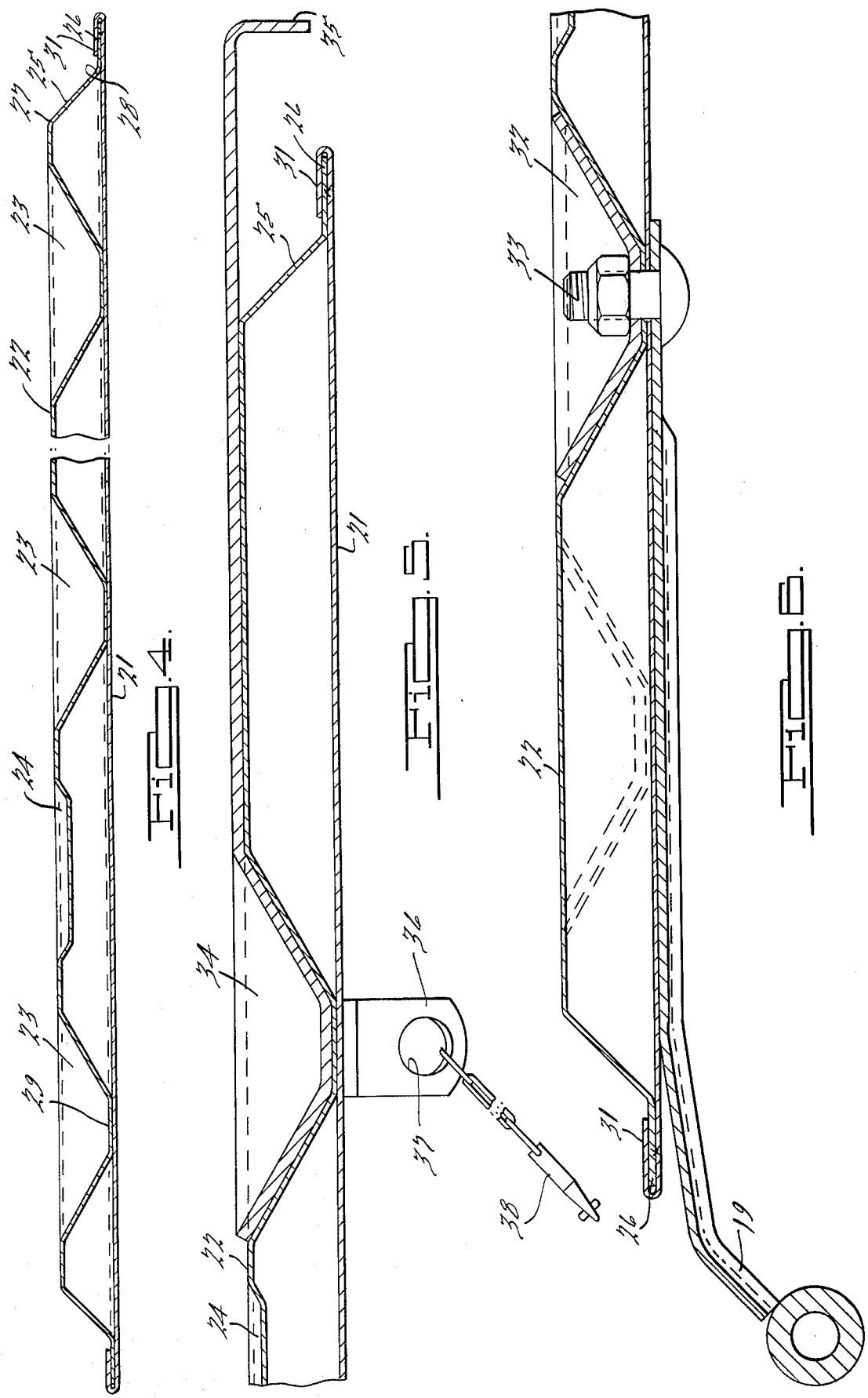

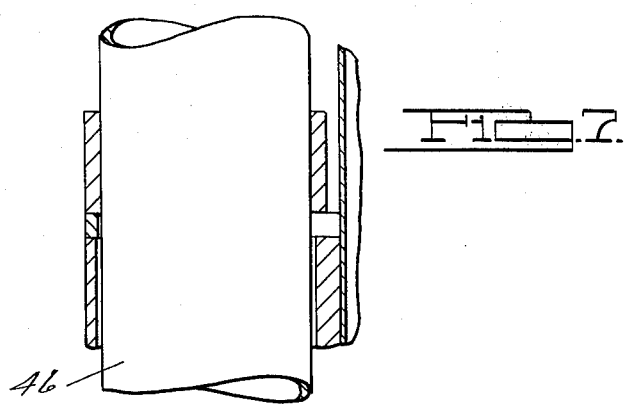
FIG. 7.
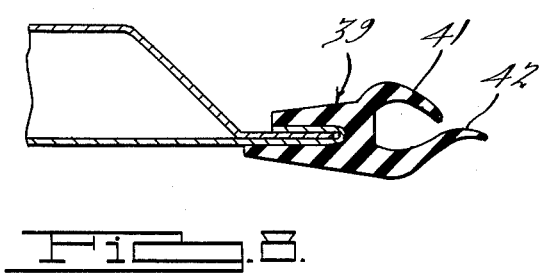
FIG. 8.
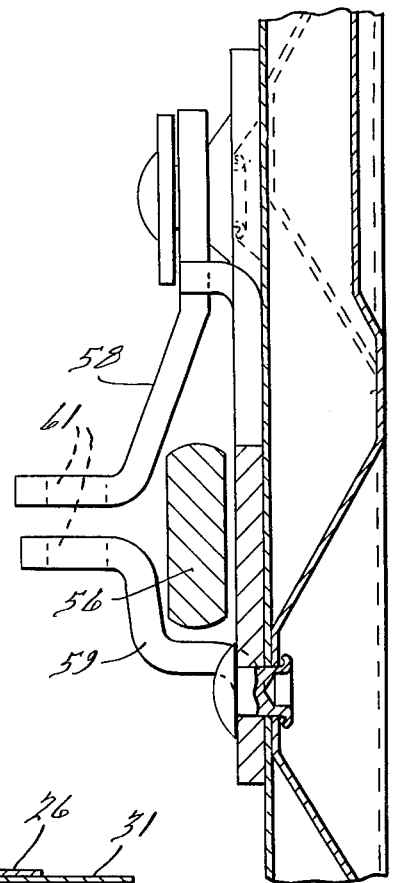
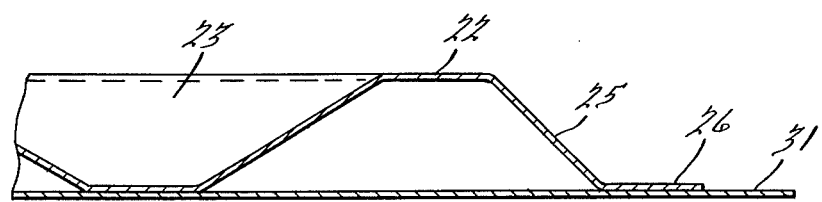
FIG. 9.
FIG. 10.
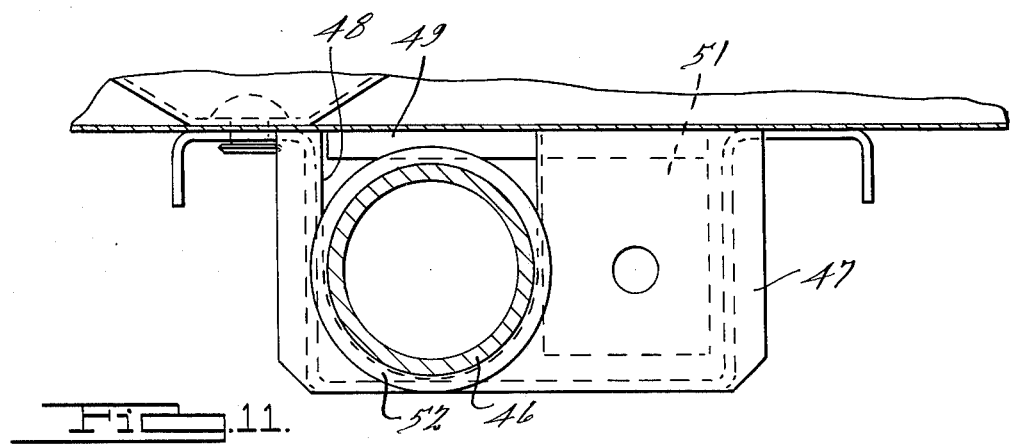
FIG. 11.

DIMPLED DOOR HARDWARE

BACKGROUND OF THE INVENTION

Reference may be had to the following patents which have been uncovered and which has bearing on the disclosure covering door hardware. U.S. Pat. Nos. 297,262; 1,100,820; 1,197,188; 1,277,622; 1,500,169; 1,729,039; 1,760,173; 2,738,297; 2,944,303; 2,986,244; 3,173,383; 3,362,737; 3,434,751; 3,572,794; 3,627,366; 3,633,954.

SUMMARY OF THE INVENTION

The invention pertains to hardware for a door edge opposite to that which is supported on hinges. A channel shaped element having oppositely extending flanges is mounted on the door to provide reinforcement therefor adjacent to the free edge. The top and bottom ends of the channel element have a plate welded thereover containing a U-shaped recess at one side and a central aperture on the opposite side. A locking rod is supported in said U-shaped recesses at the top and at the bottom and a plate is secured thereover having a rest pad which extends over and closes the end of the U-shaped recess. The lock rod has a collar at the top and bottom which engages the closure plate and forms a bearing cup for supporting the lock rod against endwise movement while permitting it to rotate within the channel shaped element. The lock rod projects beyond the bearing cups at the top and bottom and forms a cantilever support for the lock rod ends which provide a moment arm along the rods from the bearing cups to the ends. The ends of the rod have locking cam elements thereon which when rotated to door-closed position engages the cam surfaces on castings supported on the header and sill for drawing the doors into closed latched position.

The door has a flat outer panel and an inner panel provided with large truncated conical dimples alone or with rows of narrow extending depressions. The inner flat edge of the dimples and the flange at the panel edges are spot welded to the outer panel with the extending portion of the outer panel edge reversely bent over the flange welded adjacent thereto to form the door edge. The edge is located adjacent to a sloping wall on the inner panel which provides strength to the edge of the assembly. The door formed in this manner was found to resist distortion when substantial force was applied over the entire inner surface thereof. This force causes the ends of the locking rod to deflect from the cantilever supported end an amount which caused no damage to the hardware. When the load is substantially increased, a shorter moment arm results when the ends of the locking rod engage the adjacent edges of the door to further resist deflection. When the load is substantial in the nature of 40,000 pounds, some slight deflection will be noted in the door edge but no harm resulted therefrom.

BRIEF DESCRIPTION OF THE DRAWINGS

FIG. 1 is a view in elevation of the rear end of an over-the-road vehicle having its rear opening closed by a pair of doors with hardware thereon embodying features of the present invention;

FIG. 2 is an enlarged view of the lefthand door illustrated in FIG. 1;

FIG. 3 is a view of the structure illustrated in FIG. 2, showing the inner face of the door;

FIG. 4 is an enlarged sectional view of the structure illustrated in FIG. 3, taken on the line 4—4 thereof;

FIG. 5 is an enlarged broken sectional view of the structure illustrated in FIG. 2, taken on the line 5—5 thereof;

FIG. 6 is an enlarged broken sectional view of the structure illustrated in FIG. 2, taken on the line 6—6 thereof;

FIG. 7 is an enlarged broken sectional view of the structure illustrated in FIG. 2, taken on the line 7—7 thereof;

FIG. 8 is an enlarged broken sectional view of the structure illustrated in FIG. 2, taken on the line 8—8 thereof with the edge flange shown in extended position;

FIG. 9 is an enlarged broken sectional view of the structure illustrated in FIG. 3, taken on the line 9—9 thereof;

FIG. 10 is an enlarged sectional view of the structure illustrated in FIG. 2, taken on the line 10—10 thereof, and FIG. 11 is an enlarged sectional view of the structure illustrated in FIG. 2, taken on the line 11—11 thereof.

DESCRIPTION OF THE PREFERRED EMBODIMENT

Referring to the Figures, an over-the-road vehicle in the nature of a trailer or van 11 has a rear opening 12 defined by side pillars 13 and 14, a header 15 and a sill 16. A pair of doors 17 and 18 are secured by hinges 19 to the pillars 13 and 14. Each door has an outer panel 21 of a plain sheet of metal and an inner panel 22 containing a plurality of truncated conical dimples 23. Elongated depressions 24 may be provided between the dimples both lengthwise and transversely of the rows thereof. The outer edges 25 of the inner panel slopes outwardly with the outer edges forming flanges 26. The corners of the panel 22 are so cut that after bends 27 and 28 are formed therein the metal thereat is in engagement forming a closed corner. The outer panel rests upon the inner panel and the inner wall 29 of the dimples are spot welded to the inner face of the outer wall 21. The flanges 26 about the edges of the inner wall are spot welded to the inner surface of the outer panel with a flange 31 about the outer panel reversely bent back over the welded flanges 26 of the inner panel.

Truncated conical dish shaped elements 32 are placed in certain of the truncated conical dimples, as illustrated in FIG. 5, which may be spot welded to the dimples or which may be secured thereto by bolts 33 which secure the hinges 19 to the doors, as illustrated in FIGS. 1 and 5. A dish shaped end 34 is likewise secured in a dimple at the edge of the door opposite to that having the hinges 19 thereon and extends forwardly of the flange 31 at 35 to provide an anti-theft plate over which the adjacent door edge extends to prevent the door from being opened. A bracket 36 is also welded to the outer panel in alignment with the weld of the dish shaped element 34 having an aperture 37 therein containing a chain 38 having a pin (not shown) on the end which can be placed in an eye on the body side to retain the door open thereagainst. The edge of the lefthand door has a sealing gasket 39 secured therealong which is provided with a pair of lips 41 and 42 which receives the opposite door edge and forms a seal therealong when the doors are drawn into clamped relation at the end of the closing movement.

Channel shaped elements 43 have outwardly extending flanges 44 secured by a plurality of rivets 45 to the door face to provide reinforcement therefor and to encompass locking rods 46 which are journaled therein. The channel shaped elements are enclosed at each end by a plate 47 having a U-shaped opening 48 at the inner side which is closed by a rest pad 49 and a plate 51 after the locking rods are placed therein. A bearing sleeve 52 is secured at each end of the locking rods 46 to prevent the axial movement of the locking rod while permitting them to be rotated. The ends of the locking rods 46 have arcuate fingers 53 which extend within the castings 54 which are aligned therewith on the header 15 and the sill 16. The casting is the same or similar to that disclosed in U.S. Pat. No. 3,633,954, issued Jan. 11, 1972 for Unit Door Closure and Latch which was assigned to the assignee of the present invention. As the doors are pried to closure position, the edge of the righthand door is sealed between the lips 41 and 42 of the resilient strip 39 secured to the lefthand door edge.

The locking rod 46 has a bracket 55 extending from one side thereof near the bottom below the end of the channel element 43 with a lever 56 secured thereto by a pivot 57. The locking rod is rotated into camming position by the lever 56 which may be locked in door-closed position by a pivoted link 58 which covers a bracket 59 in which the lever rests and which may be secured by a lock, the clasp of which extends through aligned apertures 61 in the link and bracket. When in locked position, the door, substantially reinforced by the dimples 23 and depressions 24, can withstand a substantial force when applied over the entire inner door surface. The ends of the locking rods extending beyond the bearing sleeves 52 will deflect thereat providing a moment arm from the sleeve to the end of the locking rods.

When 10,000 pounds is applied in this manner, the ends of the locking rods will deflect and spring back to their original position when the load is removed. A greater force in the order of 20,000 pounds, when applied over the inner door surface, will cause the ends of the locking rods to deflect an amount to engage the edge 62 at the top and bottom of the door. This will substantially shorten the moment arm to that from the edge of the door panel to the end of the locking rods. Upon the release of the force applied over the entire inner surface of the door, the locking rod will move back to its original position without any set therein or in the door edge. When 40,000 pounds was similarly applied to the inner surface of the door, the deflection of the locking rods is such as to have them engage the edge of the door with such force as to cause a slight deflection to the door edge which is permanently set when the force is removed without any damage whatsoever occurring to the locking rod or to the panels other than that at the edge of the door.

The tests have proved conclusively that the employment of the truncated conical dimples with or without the elongated depressions on the inner door panel with the inner edges of the dimples welded to the outer door panel, provides substantial rigidity and strength thereto. The use of the channel elements near the free edge of the door provides further reinforcement thereto and a support for enclosing the major portion of the locking rods. The end portions of the locking rods from the ends of the reinforcing channel element are supported in cantilever and deflect therefrom when a substantial load is applied over the inner surface of the doors. The moment arm, from the bushings at the end of the channel element to the locking rod end, is substantially reduced in length when a greater load is applied over the inner door surfaces. The locking rod ends deflect a greater amount so that the door edge is engaged thereby to reduce the length of the moment arm and provide greater resistance to the applied force. This change in the length of the moment arms was found to provide added strength against the setting of the metal of the locking rods, the door panels or door edges to prevent permanent damage thereto even under the severe loads applied over the surface of the doors.

What is claimed:

1. In a trailer or like vehicle having a rear door opening defined by spaced pillars, a header and a sill, a door rotatably mounted on one of said pillars, a lock rod disposed in spaced parallel relation to the axis of rotation of the door and extending therebeyond in overlapping relation to said header and sill, means on each end of said lock rod for engaging latch means on the header and sill in vertical and horizontal stress transfer relationship, a channel shaped enclosure secured to the door in stress transfer relationship therewith and enclosing the central portion of said locking rod, and a bushing at each end of said channel shaped enclosure for supporting said locking rod for rotation between a locked and unlocked condition, said bushing being spaced from the respective top and bottom edge of said door and said lock rod having bendable end portions between each respective bushing and latch means thereby providing respective bending moment arms, application of a load on the inner face of the door sufficient to cause substantial bending of the end portions of the locking rod in cantilever from said bushings causing said end portions to move into engaging relationship with the respective top and bottom door edges thereby reducing the length of the bending moment arm at the end portions of the locking rod.

2. In a trailer or like vehicle as recited in claim 1, wherein the door has a flat outer panel and an inner panel which has edges sloping outwardly to a flange and a central portion which has deflected areas therein engaging and welded to the inner surface of the outer panel.

3. In a trailer or like vehicle as recited in claim 6, wherein a flange forming the edge of the inner panel is welded to the outer panel which has a portion extending beyond the flange of the inner panel which is return bent thereover to provide further strength thereto.

4. In a trailer or like vehicle as recited in claim 2, wherein the cantilever support for said locking rod ends provide bending moment arms resisting loads on the inner surfaces of the doors which moment arms are automatically reduced in length upon application of a load of about 20,000 pounds by the locking rod ends engaging the door edges to increase resistance to an increased load applied to the inner faces of the doors.

* * * * *